March 22, 1949.  N. N. CHARAP  2,464,964
SELECTIVE STATION ELECTRICAL OUTLET MOLDING
Filed June 25, 1945
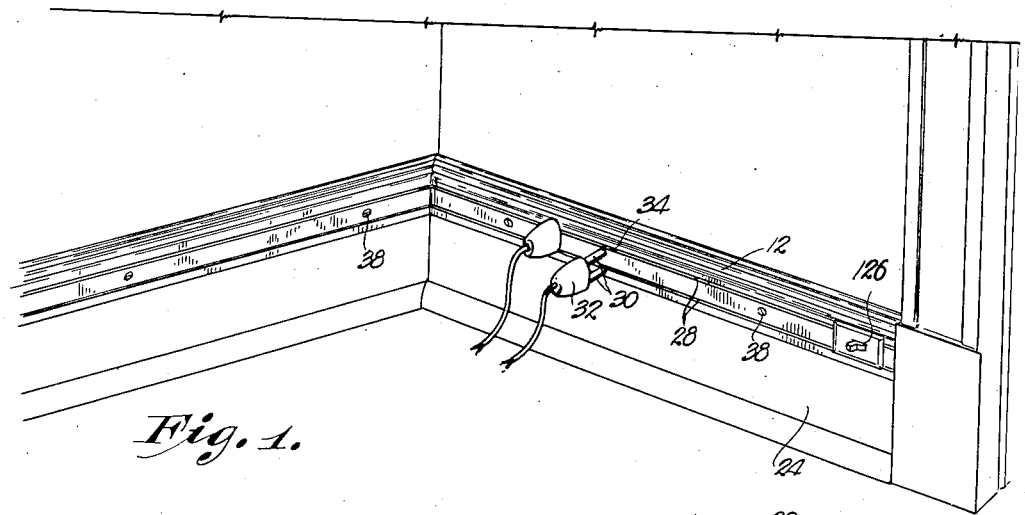
Fig. 1.
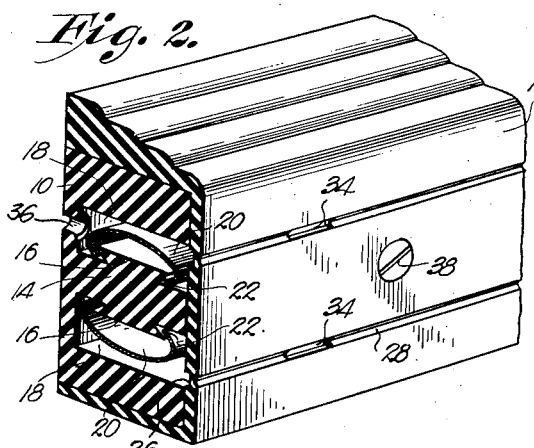
Fig. 2.
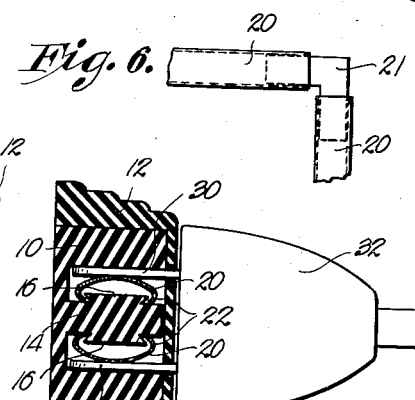
Fig. 6.
Fig. 3.
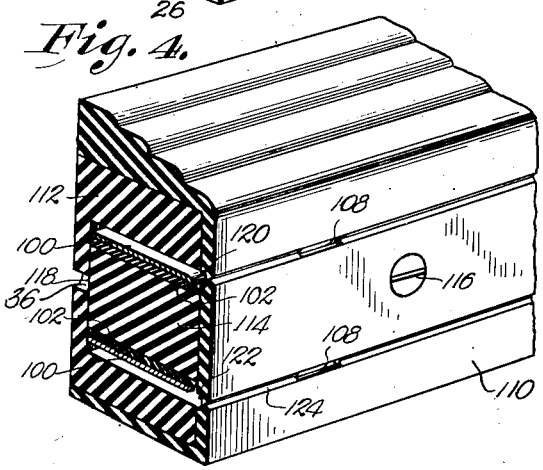
Fig. 4.
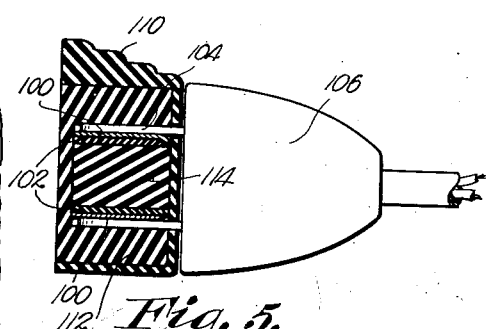
Fig. 5.
INVENTOR.
Norman N. Charap
BY
ATTORNEY Patented Mar. 22, 1949

2,464,964

UNITED STATES PATENT OFFICE 2,464,964

SELECTIVE STATION ELECTRICAL OUTLET MOLDING

Norman N. Charap, Brooklyn, N. Y.

Application June 25, 1945, Serial No. 601,364

1 Claim. (Cl. 173—334.1)

This invention relates to electrical outlets for buildings where a number of appliances or lamps are to be connected but the location of said appliances and lamps is not known when the building is erected.

One of the primary objects of this invention is to provide a selective station electrical outlet molding that may form a part of the room trim; that may have any number of outlets for electrical cord extensions formed therein; that may be manufactured from extrudible material such as plastic; that has the component parts thereof assembled without employment of fastening means; wherein the main elements of the outlet molding are formed to interengage by virtue of their contour; and that is not restricted as to the number of outlets.

Other objects of the invention will appear during the course of the following specification, referring to the accompanying drawing wherein:

Fig. 1 is a perspective view of a room corner having a selective station electrical outlet molding made pursuant to the present invention.

Fig. 2 is a perspective cross sectional view of the molding.

Fig. 3 is a cross sectional view showing an electrical connecting plug in place.

Fig. 4 is a sectional perspective view of electrical outlet molding made in accordance with a modified form of the invention.

Fig. 5 is a cross sectional view through the molding shown in Fig. 4, with an electrical connecting plug in place; and Fig. 6 is a detailed view illustrating a corner structure of the current conducting parts of the molding.

All attempts to produce molding or trim wherein electrical conductors are disposed, have fallen short of commercial success because of the cost of manufacture, installation, and the inconvenience of forming openings for connecting plugs at points where desired. The molding shown in Figs. 1 to 3 inclusive, is inexpensive to manufacture, attractive when installed; quickly assembled; and easy to manipulate when altered for the reception of electrical connecting plugs.

It is desirable to form the core 10 and hood 12 of non-conducting material in the nature of plastic or substance that may be extruded through dies having openings of attractive contour so far as hood 12 is concerned.

Core 10 is E-shaped in transverse cross section and the central leg 14 has undercut beads 16 along opposite sides thereof, as illustrated in Figs. 2 and 3. In other words, core 10 is polygonal in transverse cross section and has grooves 18 formed inwardly from one side thereof and longitudinally along its entire length to accommodate bus bars 20 formed as shown.

These bus bars 20 are of conducting material such as brass or copper. They are made from originally flat stock passed through a draw bench having a number of rollers that transversely arch the strip and form inturned flanges 22 along each longitudinal edge. These inturned flanges enter the undercut portions of beads 16 and slide into place when the bus bars 20 are introduced into grooves 18 from either end thereof.

It will be obvious to those skilled in the art that as core 10 is extruded, it is cut into lengths of desired dimensions and that bus bars 20 may be assembled therewith at the factory or on the job. No special tooling is necessary and the workman may accomplish the same end at the point of installation the same as though the parts were brought together at the factory.

Hood 12 is likewise of insulating material and desirably extruded through dies of suitable contour. Hood 12 becomes a part of the molding or baseboard 24 when installed in a room, as illustrated in Fig. 1.

Hood 12 has longitudinal lines of weakness provided therein in the nature of an internal groove 26 and an external groove 28. These grooves 26 and 28 are in opposed relation and establish a thin zone along hood 12 near bus bars 20 where prongs 30 of a connecting plug 32 may engage bus bars 20 when said prongs 30 are passed through openings 34 formed by the person exercising selective powers as to the location of the outlet.

When openings 34 are formed, it is but necessary to employ a knife or small screw driver and tap the material between grooves 26 and 28 where it breaks away. The distance between openings 34 is the same as the space between prongs 30. The initial distance between bus bars 20 and specifically, the outer face of the convex surfaces thereof, is greater than the distance between prongs 30 so that a tight frictional engagement is set up when prongs 30 are introduced through openings 34.

During installation, core 10 is fastened to a supporting surface through the use of screws or analogous means passed through openings 36 supplied for the purpose. Hood 12 is held in the assembled position by screws 38 passing into core 10 and completely therethrough, if such is desired. Bus bars 20 are rendered continuous when a corner is negotiated through the employment of L-shaped, flat members 21 that fit into bars 20 between flanges 22 thereof, as shown in Fig. 6.

The modified form of the invention illustrated in Figs. 4 and 5, embodies the resiliency necessary for bars 100, because each is underlaid by a strip of material 102 of sufficient thickness and yieldability to allow bars 100 to move together when prongs 104 of plug 106 are inserted through openings 108 provided in hood 110.

Core 112 is extruded and made of insulating material but the cross section thereof, in this instance, is U-shaped to receive a central strip 114 against the upper and lower sides whereof the bar and resilient strip construction 100 and 102, is disposed. Screws 116 serve to hold hood 110 in place and these screws likewise maintain strip 114 in place after nails or screws are introduced through holes 118 in one wall of core 112.

The marginal longitudinal edge of each strip 100 is inclined as at 120 to avoid obstructing the entrance of prongs 104 when resilient strip 102 is fully extended. Openings 108 are struck from the front wall of hood 110 by the same method as above described because grooves 122 and 124 in hood 110 are identical in nature as grooves 26 and 28 in hood 12.

Cores 10 and 112 as well as hoods 12 and 110 are contoured to permit extruding without interruption. The extruded members may be cut to length and holes 36 and 118 formed after the cores and hoods are ready for installation.

A master switch 126 located at the point shown in Fig. 1, is used to control the flow of current from supply lines to bars 20 and 100, as the case may be.

It is understood that moldings having physical characteristics different from those illustrated, may be made without departing from the spirit of the invention or scope of the appended claim.

Having thus described the invention, what is claimed as new and desired to be secured by Letters Patent is:

A selective station outlet molding of the character described, comprising an elongated core of insulating material having a pair of longitudinal, side-by-side grooves extending inwardly from one side thereof; a resilient bus bar of conducting material in each of the grooves respectively; and a U-shaped hood of insulating material fitted over the said core, said hood having a pair of continuous longitudinal lines of weakness overlying the grooves of the core to permit easy perforation of the hood for the introduction of the prongs of an electrical connecting plug, said bus bars each having a rebent flange along each longitudinal edge thereof, said core having a dove-tail shaped rib in each groove respectively to receive the said flanges and floatingly hold the bus bars in place.

NORMAN N. CHARAP.

REFERENCES CITED

The following references are of record in the file of this patent:

UNITED STATES PATENTS

| Number | Name | Date |
| --- | --- | --- |
| 2,117,816 | Ness | May 17, 1938 |
| 2,158,969 | Oliver | May 16, 1939 |
| 2,190,196 | Semenyna | Feb. 13, 1940 |
| 2,267,610 | La Jone | Dec. 23, 1941 |

FOREIGN PATENTS

| Number | Country | Date |
| --- | --- | --- |
| 517,318 | Great Britain | Jan. 26, 1940 |
| 606,205 | France | June 9, 1926 |